(12) United States Patent
Hinzen

(10) Patent No.: US 11,655,636 B2
(45) Date of Patent: May 23, 2023

(54) REINFORCING BODY AND METHOD FOR ITS MANUFACTURING

(71) Applicant: Solidian GmbH, Albstadt (DE)

(72) Inventor: Marcus Hinzen, Albstadt (DE)

(73) Assignee: SOLIDIAN GMBH, Albstadt (DE)

( * ) Notice: Subject to any disclaimer, the term of this patent is extended or adjusted under 35 U.S.C. 154(b) by 0 days.

(21) Appl. No.: 16/523,700

(22) Filed: Jul. 26, 2019

(65) Prior Publication Data

US 2020/0032515 A1 Jan. 30, 2020

(30) Foreign Application Priority Data

Jul. 27, 2018 (EP) ..................................... 18186149

(51) Int. Cl.
*E04C 5/07* (2006.01)
*B29C 70/06* (2006.01)
(Continued)

(52) U.S. Cl.
CPC .............. *E04C 5/073* (2013.01); *B29C 53/58* (2013.01); *B29C 53/583* (2013.01); *B29C 70/06* (2013.01); *B29C 70/205* (2013.01)

(58) Field of Classification Search
CPC . E04C 5/073; E04C 5/07; B29C 70/06; B29C 70/205; B29C 53/58; B29C 53/583
See application file for complete search history.

(56) References Cited

U.S. PATENT DOCUMENTS 3,167,882 A * 2/1965 Abbott ....................... E04C 5/08
264/426

3,969,121 A * 7/1976 Atkinson ................... C03C 3/04
501/38
(Continued)

FOREIGN PATENT DOCUMENTS

DE 1936078 A1 1/1971
DE 3703974 A1 * 8/1988 ............... E04C 5/07
(Continued)

OTHER PUBLICATIONS

"Study on Aramid Fibre and Comparison with Other Composite Materials" by Sahu, Khande, Patel, Sen, and Bohidar published in the International Journal for Innovative Research in Science and Technology (IJIRST); vol. 1, Issue 7 in Dec. 2014 (Year: 2014).*
(Continued)

*Primary Examiner* — Brian D Mattei
*Assistant Examiner* — Charissa Ahmad
(74) *Attorney, Agent, or Firm* — Fitch, Even, Tabin & Flannery LLP

(57) ABSTRACT

A reinforcing body and a method for its manufacturing. The reinforcing body has at least one reinforcing bar. Each reinforcing bar has a core with a peripheral surface at which a rib structure with at least one rib and at least one depression is provided. The core is formed by at least one first fiber strand embedded in a core matrix. For creating the at least one rib at least one second fiber strand is embedded into a rib matrix, wherein the at least one second fiber strand and the rib matrix are separated by at least one depression in a direction parallel to a longitudinal center axis of the reinforcing bar, such that the at least one second fiber strand is separated into fiber strand sections. The at least one first and the at least one second fiber strand have fibers of different materials.

9 Claims, 5 Drawing Sheets

(51) Int. Cl.
  *B29C 53/58* (2006.01)
  *B29C 70/20* (2006.01)

(56) References Cited

U.S. PATENT DOCUMENTS

| | | | | |
|---|---|---|---|---|
| 4,016,714 | A * | 4/1977 | Crandall | D07B 1/142 57/234 |
| 4,095,986 | A * | 6/1978 | Matsuda | C03C 3/087 501/38 |
| 4,620,401 | A * | 11/1986 | Esperance | B29C 70/205 52/309.15 |
| 4,660,364 | A * | 4/1987 | Chiang | A63B 51/02 57/210 |
| 4,876,143 | A * | 10/1989 | Sugita | B29C 70/088 428/298.4 |
| 5,114,290 | A * | 5/1992 | Moghe | B29C 53/585 156/391 |
| 5,127,783 | A * | 7/1992 | Moghe | C04B 35/117 411/411 |
| 5,362,542 | A * | 11/1994 | Ozawa | E04C 5/07 428/156 |
| 5,529,731 | A * | 6/1996 | Bendick | B29C 44/1209 156/173 |
| 5,567,374 | A * | 10/1996 | Thicthener | B29C 33/42 156/166 |
| 5,580,642 | A * | 12/1996 | Okamoto | E04C 5/07 428/212 |
| 5,650,109 | A * | 7/1997 | Kaiser | B29C 70/081 264/136 |
| 5,727,357 | A * | 3/1998 | Arumugasaamy | D07B 1/025 428/377 |
| 5,749,211 | A * | 5/1998 | Kimura | B29C 61/006 264/258 |
| 6,048,598 | A * | 4/2000 | Bryan, III | C03C 25/323 427/175 |
| 6,563,054 | B1 * | 5/2003 | Damien | D07B 1/165 174/120 C |
| 2004/0018351 | A1 * | 1/2004 | Petrina | E04C 5/07 428/292.1 |
| 2011/0033646 | A1 * | 2/2011 | Shafi | F16L 9/128 428/36.9 |
| 2013/0167502 | A1 * | 7/2013 | Wilson | B29C 70/025 57/210 |

FOREIGN PATENT DOCUMENTS

| | | | | |
|---|---|---|---|---|
| DE | 102015113302 A1 * | 2/2017 | | E04C 5/03 |
| DE | 102018108804 A1 * | 10/2019 | | |
| EP | 0199348 A2 | 10/1986 | | |
| EP | 2857607 A1 | 4/2015 | | |
| EP | 3572594 A1 | 11/2019 | | |
| FR | 1473078 A * | 3/1967 | | D07B 1/16 |
| JP | 61049809 A * | 3/1986 | | B29C 70/20 |
| JP | 02225814 A * | 9/1990 | | D04C 1/06 |
| JP | 06143478 A * | 5/1994 | | E04C 5/07 |
| WO | 93/08976 A1 | 5/1993 | | |
| WO | 96/16792 A1 | 6/1996 | | |
| WO | WO-0151730 A1 * | 7/2001 | | E04C 5/03 |
| WO | 2017/211904 A1 | 12/2017 | | |
| WO | WO 2020/007252 A1 * | 12/2018 | | |

OTHER PUBLICATIONS

Machine Translation of DE 102018108804 A1 obtained by the European Patent Office (Year: 2019).*
Derwent Abstract for CN 103225369 A by Li et al. (Year: 2013).*
Literature Review of Durability of Composites in Reinforced Concrete by L.J. Malvar, Naval Facilities Engineering Service Center, SP-2008-SHR, published on Aug. 1996 (Year: 1996).*
High Strength Glass Fibers by AGY, Pub. No. LIT-2006-111, 2006 (Year: 2006).*
Extended European Search Report dated Mar. 4, 2019, in corresponding European Application No. 18186149.3 (6 pgs.).
Jong-Pil Won et al., "Durability of hybrid FRP reinforcing bars in concrete structures exposed to marine environments", Int. J. Structural Engineering, 2013, vol. 4, Nos. 1/2, pp. 63-74, Inderscience Enterprises Ltd., Switzerland. (12 pages).
Frank K. Ko et al., "Ductile Hybrid Reinforced Plastic Reinforcing Bar for Concrete Structures: Design Methodology", ACI Materials Journal, Nov.-Dec. 1998, pp. 655-666 (11 pages).
Xinsheng Xu et al., "Analysis of Hybrid Effect of Two Hybrid Fiber CGFRP Bar and Its Mechanical Properties", Applied Mechanics and Materials, 2012, ISSN: 1662-7482, vols. 166-169, pp. 680-683, Trans Tech Publications, Switzerland. (5 pages).
Chan-Gi Park, "Effect of the Volume Fraction of Jute Fiber on the Interlaminar Shear Stress and Tensile Behavior Characteristics of Hybrid Glass/Jute Fiber Reinforced Polymer Composite Bar for Concrete Structures", International Journal of Polymer Science, 2016, vol. 2016, Article ID 3042392, pp. 1-8, Hindawi Publishing Corporation (8 pages).
European Office Action dated Apr. 4, 2022, in corresponding European Application No. 18186149.3, with machine English translation (11 pages).

* cited by examiner

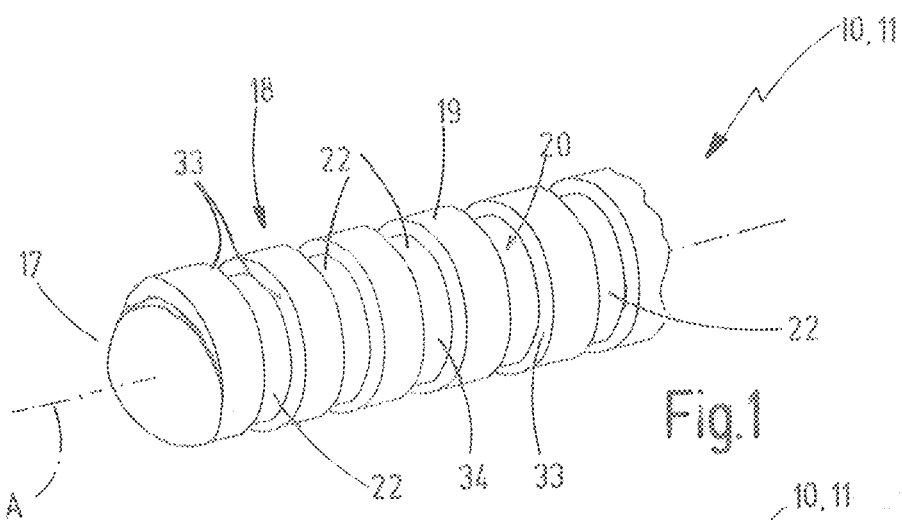
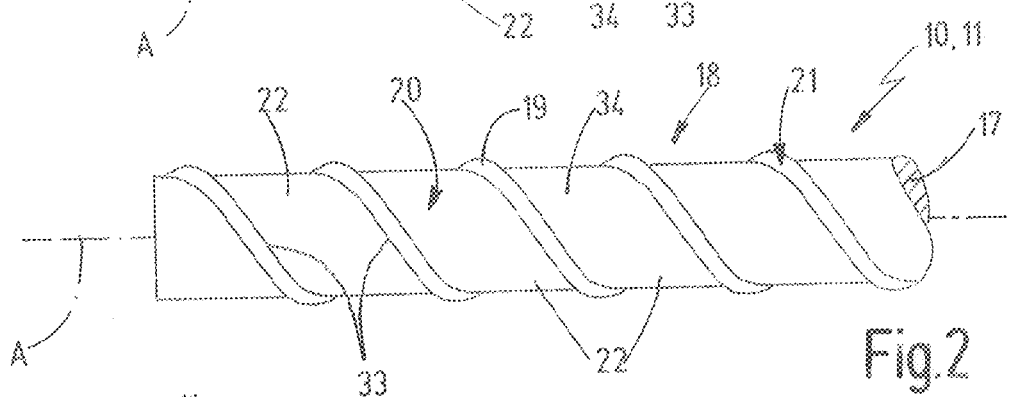
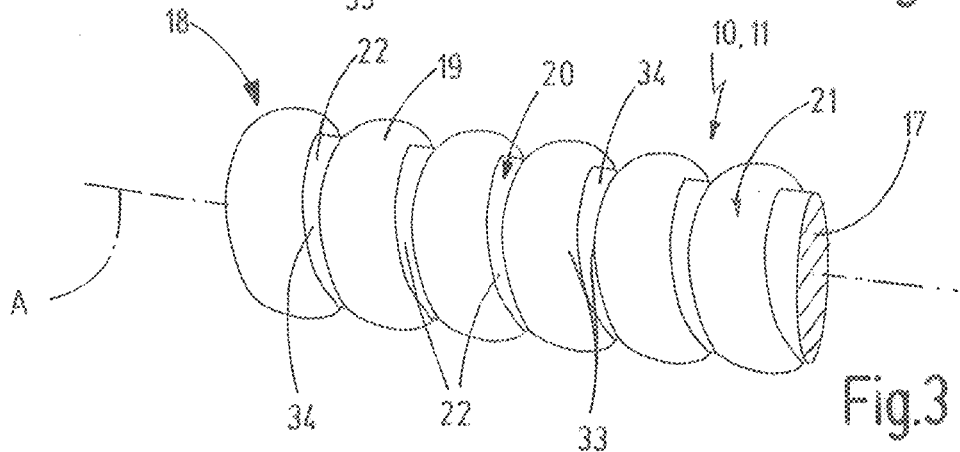
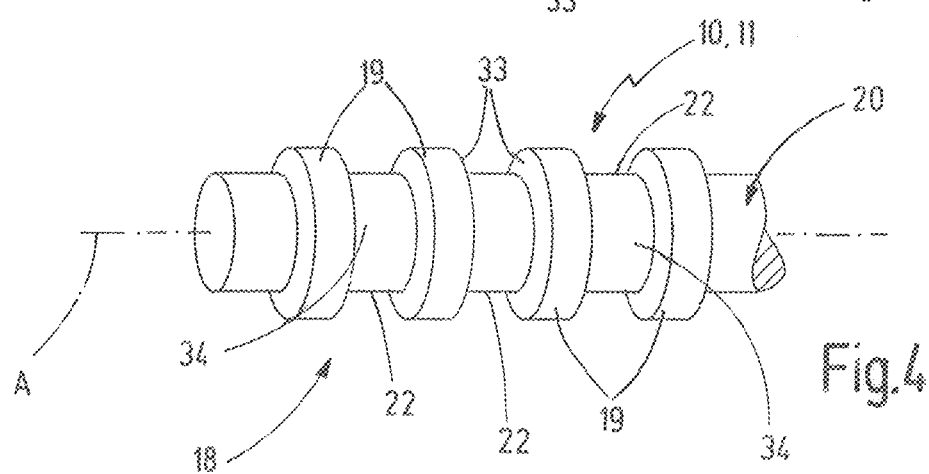

REINFORCING BODY AND METHOD FOR ITS MANUFACTURING

RELATED APPLICATION(S)

This application claims the benefit of European Patent Application No. 18186149.3, filed Jul. 27, 2018, the contents of which are incorporated herein by reference as if fully rewritten herein.

TECHNICAL FIELD

The invention relates to a reinforcing body for reinforcing of a construction material body, e.g. a concrete body. The reinforcing body has at least one reinforcing rod that comprises a matrix with fibers embedded therein. The reinforcing body thus forms a fiber reinforcement and can be referred to as fiber reinforcing body.

BACKGROUND

Such fiber reinforcing bodies are known. Won et al., "*Durability of hybrid FRP reinforcing bars in concrete structures exposed to marine environments*", Int. J. Structural Engineering, Vol. 4, Nos. 1/2, 2013, pages 63 and following discloses a reinforcing bar with different compositions of different fibers. In doing so, fibers of E-glass, aramid or carbon with different ratio can be present in a so-called hybrid reinforcing bar. At the outer periphery a non-flat structure or rib structure can be present in order to allow a better fixing of the reinforcing bar in the construction material matrix of the construction material body.

Ko et al., *Ductile Hybrid Reinforced Plastic Reinforcing Bar for Concrete Structures: Design Methodology*", ACI Materials Journal, November-December 1998, pages 655 following also discloses a hybrid reinforcing bar with braided fibers. Due to the braiding of the fibers from different materials, the mechanical properties shall be defined according to the fiber ratio. A similar reinforcing body is also known from Xu et al. "*Analysis of Hybrid Effect of Two Hybrid Fiber CGFRP Bar and its Mechanical Properties*" applied mechanics and materials, ISSN: 1662-7482, Vols. 166-169, pages 680-683, Trans Tech Publications, 2012.

In "*Effect of the Volume Fraction of Jute Fiber on the Interlaminar Shear Stress and Tensile Behavior Characteristics of Hybrid Glass/Jute Fiber Reinforced Polymer Composite Bar for Concrete Structures*", International Journal of Polymer Science, Vol. 2016, Article ID 3042392, Hindawi Publishing Corporation, Park describes a reinforcing bar comprising different ratio of jute fibers and glass fibers. The fibers are embedded to a matrix of vinyl ester. Due to the different ratio of the fiber materials, the mechanical properties, particularly the tensile properties and the interlaminar shear stress shall be defined.

WO 2017/211904 A1 discloses a method for manufacturing of a profiled fiber-reinforced plastic profile. There first reinforcing fibers are embedded into a plastic matrix for forming a plastic base body. The first reinforcing fibers are endless fibers. Second fibers are subsequently applied in sections onto the plastic base body. Subsequently the plastic base body is profiled or re-shaped. The second reinforcing fibers are remarkably shorter compared with the first reinforcing fibers and have a length of 0.1 mm to 1 mm.

WO 96/16792 A1 discloses a method in which a profiled reinforcing bar is manufactured from a core with an embedded first fiber strand. In a die the matrix material of the core is re-shaped and provided with a profiling. By injecting of plastic material into the die, a thread can be formed in one section. A similar method is also explained in WO 93/08976 A1.

Compared with reinforcing bodies made of metal, particularly steel, fiber reinforcing bodies are advantageous with regard to their lower weight, however, they involve higher costs. For this reason, fiber reinforcement has been established in the market only for a few applications.

Thus, it can be considered as an object of the invention to create a reinforcing body with which a good coupling between the reinforcing body and the construction material body is achieved and that can be economically manufactured.

SUMMARY

This object is solved by means of a reinforcing body as well as a method with the features described herein.

The inventive reinforcing body in one form comprises at least one reinforcing bar extending in an axial direction along a longitudinal center axis. The reinforcing bar can extend straight along the longitudinal center axis or can have one or more bending locations. The axial direction is orientated parallel to the longitudinal center axis at each location respectively. The reinforcing bar has a core and a rib structure arranged at the peripheral surface of the core. The rib structure can comprise one or more ribs. If several ribs are provided, the single ribs can be arranged with distance to adjacent ribs in axial direction and/or in peripheral direction. A single rib can wind, for example, helically around the longitudinal center axis.

A reinforcing body can be manufactured from one or more reinforcing bars. By shaping and arranging the at least one reinforcing bar basically arbitrary two-dimensional or three-dimensional reinforcing bodies can be formed.

Each reinforcing bar has a core with at least one first fiber strand from first fibers embedded into a core matrix. The first fiber strand is an endless fiber strand, particularly a roving.

The rib structure comprises at least one rib and at least one depression. At least one of the provided depressions can extend in a ring-shaped manner around the longitudinal center axis in peripheral direction. At least one of the provided depressions can extend helically around the longitudinal center axis.

The rib structure comprises at least one second fiber strand of second fibers that is embedded in a rib matrix and that is divided into at least two fiber strand sections by the at least one depression. The second fibers consist of a fiber material that is different from the fiber material of the first fibers. The fiber strand sections are created due to separation of the second fiber strand. The second fiber strand is in its initial condition an endless fiber strand, e.g. a roving.

Fiber strand sections of the second fiber strand that are directly adjacent in axial direction are separated from each other by the at least one depression. Each fiber strand section extends in axial direction inside a rib or a rib portion of the at least one rib. If a plurality of ribs are present that are arranged with distance to each other in axial direction, each rib comprises a fiber strand section of the second fiber strand. If the reinforcing bar comprises, e.g. a helically shaped rib, the single windings are arranged with distance in axial direction. At each observation location in peripheral direction around the longitudinal center axis the second fiber strand sections are aligned in axial direction in the directly adjacent rib portions. A configuration of the at least one rib and/or the at least one depression of the rib structure can vary depending from the shape of the reinforcing bar. In all embodiments the fiber strand sections of the second fiber strand are orientated in axial direction.

The at least one rib of the rib structure serves to fix the reinforcing bar along its extension in a construction material matrix of a construction material body. In doing so, it is avoided that the reinforcing bar moves relative to the construction material matrix and separates from the construction material matrix when supporting tensile forces applied onto the construction material body. Due to the coupling, tensile forces can be supported by the reinforcing bar that are applied onto the construction material body. For this the core of the reinforcing bar with the first fibers is used in the inventive reinforcing body.

The rib structure with the at least one rib and with the at least one depression is not configured to support tensile forces, but to couple the reinforcing bar in the construction material matrix of the construction material body. For this reason, second fibers from a different fiber material can be used there, the properties of which must not necessarily be selected with regard to supporting of tensile forces. Particularly the fiber material of the second fibers can be cheaper than the fiber material of the first fibers. For example, the second fibers may be less alkali-resistant and/or less tensile strength guaranteeing than the first fibers.

By arranging different fiber materials in the core and the rib structure, a cheap configuration of the reinforcing body as a whole can be achieved that, however, provides a good coupling in the construction material matrix and provides the necessary tensile strength due to its core.

The first fiber strand and the second fiber strand or the fiber strand sections of the second fiber strand are mainly orientated in axial direction parallel to each other at each location of the reinforcing bar, at least in sections of the reinforcing bar that extend straight. During the manufacturing of the reinforcing bar material is removed at the periphery for creating the rib structure, such that the initially continuous at least one second fiber strand is separated. In each of the at least one remaining rib a second fiber strand section is present.

The fiber strand sections extend in axial direction, particularly completely through a rib and/or a rib portion or rib section that is limited by the at least one depression. Each fiber strand section has two axial ends that end in a respective axial and surface of the rib or the rib portion or the rib section.

The at least one first fiber strand and the fiber strand sections of the at least one second fiber strand are preferably arranged in the reinforcing bar under an axial pretension. The amount of this axial pretension can vary and can be set, for example, during the manufacturing of a reinforcing bar blank during a pultrusion method or another suitable manufacturing method by embedding the fiber strands in the respective matrix under a tensile pretension axially stretched as far as possible.

A reinforcing bar blank can be manufactured very simply, e.g. in a pultrusion method in which a coating layer with the at least one second fiber strand embedded into the rib matrix is applied onto the core. In this reinforcing bar blank the at least one depression can be introduced by material removable such that the rib structure is created. In doing so, the core and in particular the first fiber strand remain preferably unimpaired. Independent from which form the at least one rib or the at least one depression of the rib structure comprises a similar reinforcing bar blank can be used respectively. Because the at least one second fiber strand is present in the coating layer, the reinforcing bar can be well compacted in the pultrusion process and excess matrix material can be removed from the core or the coating layer respectively. A compact reinforcing bar is created that is able to support high tensile forces.

The removing of excess matrix material comprises, for example, the radially compressing of the fiber strands in order to compress excess matrix material from the fiber composition of the at least one first fiber strand and the at least one second fiber strand. In doing so, a compact fiber composite with high tensile strength is created. Also the coupling between the at least one first fiber strand and the at least one second fiber strand can be improved in this way.

The first fibers extend preferably mainly parallel to the longitudinal center axis of the reinforcing bar, at least in straight extending sections of the reinforcing bar. Mainly parallel means a stretched orientation along the longitudinal center axis as far as possible, wherein technically unavoidable bendings or ondulations can be present. If the reinforcing bar comprises a bending or corner location, deviations between the orientation of the first fibers and the longitudinal center axis can occur at the bending or corner location, because the bent or corner radius is radially inward smaller than radially outward.

It is preferred, that neither the first fibers nor the second fibers are braided. Preferably the second fibers extend parallel to the first fibers. The second fibers can be aligned in a stretched manner and mainly parallel to the longitudinal center axis of the reinforcing bar at least in straight extending sections of the reinforcing bar. Analog to the orientation of the first fibers, deviations of this preferred orientation may occur in the range of bending or corner locations.

The rib structure comprises at least one rib and at least one depression. This depression is arranged preferably completely outside of the core. Orthogonal or radial to the extension direction of the reinforcing bar the depression may have a depth of at least 0.5 mm or at least 2-3 mm. The depth of the depression can have an amount of, e.g. at least 10% or 15% or 20% of the diameter of the core of the reinforcing bar.

The at least one rib has a width of at least 1 mm or at least 2 mm or at least 5 mm in axial direction of the reinforcing bar or parallel to the longitudinal center axis of the reinforcing bar and/or can have a maximum width of 20 mm or 15 mm or 10 mm. These values refer to a configuration of the reinforcing bar, in which the rib structure is created by material removal for forming of at least one depression.

Preferably the fiber material of the first fibers has a higher tensile strength than the fiber material of the second fibers. For example the first fibers can comprise carbon or may consist of carbon. The first fibers can also comprise AR-glass or can consist of AR-glass. In a preferred embodiment the second fibers comprise glass or consist of glass. For example E-glass, ECR-glass or AR-glass can be used as glass for the second fibers. The second fibers can additionally or alternatively comprise basalt or a polymer as, for example polypropylene or can consist of basalt or a polymer, e.g. polypropylene.

The volume ratio of the first fibers in the core has an amount of 40% to 90% of the total volume portion of all of the fibers. In a preferred embodiment the volume ratio of the first fibers is larger than the volume ratio of the second fibers. Because the rib depth often increases less than the diameter of reinforcing elements, the volume ratio of the first fibers has mostly a higher value in reinforcing elements (reinforcing bars) with larger diameters (of for example 30 mm), as in reinforcing elements (reinforcing bars) with smaller diameters (of for example 6 mm).

Preferably the reinforcing bar is completely free of metallic materials.

For the core matrix and/or the rib matrix epoxy resin, vinylester, polyurethane, polyethylene, polystyrene, a polysiloxane or an acrylate can be used as matrix material. The core matrix and the rib matrix can respectively consist of a uniform matrix material. The matrix material for the core matrix and the rib matrix can be equal. It is also advantageous to use a first matrix material for the core matrix and a second matrix material that is different from the first matrix material for the rib matrix.

Any embodiment of a reinforcing body, particularly of reinforcing body as described above, can be manufactured by an inventive method as follows:

First a reinforcing bar blank is manufactured, e.g. by a pultrusion method. The reinforcing bar blank has a core as well as a coating layer that abuts at the peripheral surface of the core and surrounds a core at the peripheral surface completely. The core comprises at least one first fiber strand of first fibers embedded into a core matrix. The coating layer comprises at least one second fiber strand of second fibers embedded into a matrix of the coating layer. The second fibers consist of a fiber material that is different from the fiber material of the first fibers. The core and the coating layer can be manufactured together in a manufacturing method, particularly in a pultrusion method or timely after one another, e.g. in a respective pultrusion method step.

After the manufacturing of the reinforcing bar blank with the core and the coating layer the rib structure is created in the coating layer. In doing so, at least one depression is introduced into the coating layer, e.g. by a removal method using a chip removing tool, using a laser or the like. Due to the introduction of the at least one depression, a rib structure is formed in the coating layer. For example several ring-shaped and particularly circular ring-shaped depressions can be introduced with distance to each other in the coating layer. Additionally or alternatively at least one helically extending depression can be introduced in the coating layer, such that at least one helically extending rib is formed. Also at least one depression can be introduced that extends in axial direction.

The at least one depression has preferably the shape of a groove with two side walls or groove flanks opposing each other that are connected by a bottom or groove ground. The at least one depression is preferably completely arranged outside the core. Preferably the depression has depth that amounts at least 50% of the thickness of the coating layer. The bottom of the depression or the groove ground can be formed by the peripheral surface of the core. The side walls of the depression or the groove flanks are formed by the material of the coating layer that is present adjacent to the depression. It is alternatively also possible to arrange the groove ground within a core, wherein the penetration depth of the depression in the core amounts preferably at most 15% or at most 20% of the half cross-section diameter of the core that corresponds to the radius in a circular cross-section of the core.

During manufacturing of the at least one depression the second fibers in the coating layer are separated in the range of the depression. This is non-critical, because the second fibers are not required for supporting of tensile forces along the reinforcing bar. The tensile forces are supported by the first fibers present in the core.

BRIEF DESCRIPTION OF THE DRAWINGS

Preferred embodiments of the invention are derived from the dependent claims, the description and the drawings. In the following preferred embodiments of the invention are explained in detail with reference to the attached drawings. The drawings show:

FIGS. 1-4 a schematic illustration of an embodiment of a reinforcing body in the form of a reinforcing bar respectively, FIG. 5 a cross-section of a reinforcing bar blank with a core and a coating layer that surrounds the peripheral surface of the core during the manufacturing of a reinforcing body.

DETAILED DESCRIPTION

In FIGS. 1-4 different embodiments of reinforcing bodies 10 that are configured as reinforcing bar 11 respectively, are schematically illustrated. A reinforcing bar 11 can extend straight along a longitudinal center axis A. The reinforcing bar 11 can in modification to the illustrated embodiments also comprise one or more bending locations or corner locations.

Figures 13, 14, 15:
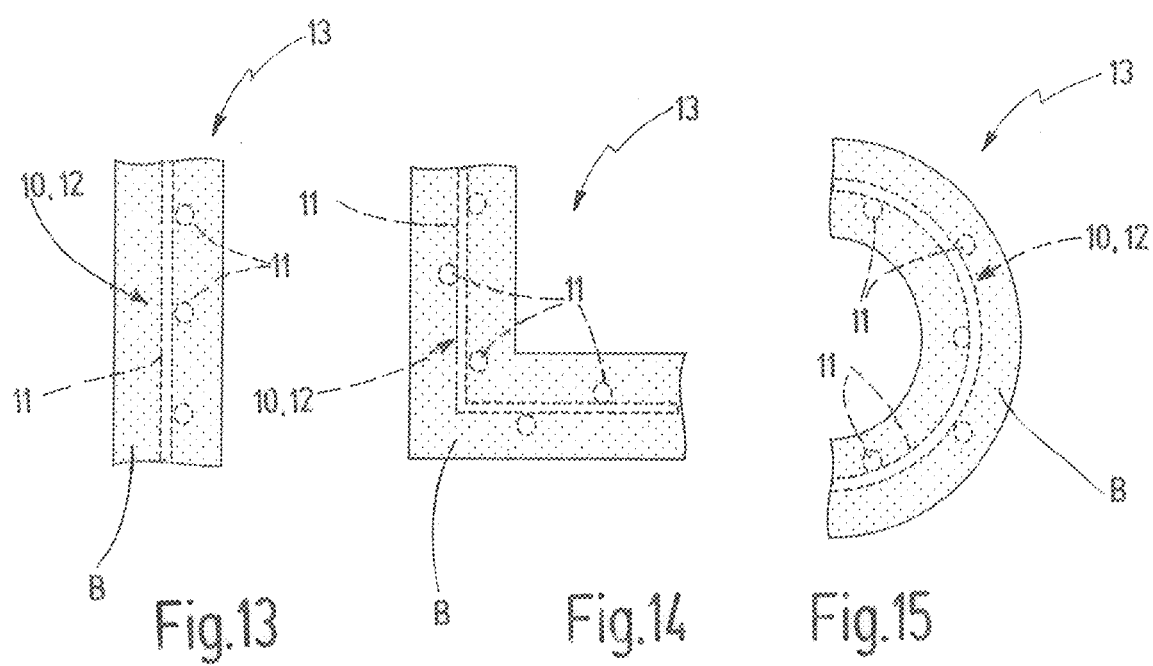

In the simplest case a reinforcing body 10 is formed by one single reinforcing bar 11. In other embodiments a plurality of reinforcing bars 11 can form one reinforcing body 10, e.g. a reinforcing grid 12 for reinforcing a construction material body 13 (FIGS. 12-15). The construction material body 13 comprises a construction material matrix B of concrete or mortar. The reinforcing body 10 or the reinforcing grid 12 is embodied in the construction material matrix B in order to support tensile forces acting on the construction material body 13. In doing so, the reinforcing grid 12 can extend mainly parallel to one plane as it is exemplarily illustrated in FIGS. 12 and 13. Alternatively thereto, the reinforcing grid 12 can also comprise at least one bending or corner location as it is schematically illustrated in FIGS. 14 and 15. Finally any two-dimensional or three-dimensional reinforcing body 10 can be formed, as it is required or suitable for reinforcing a respective construction material body 13 by using one reinforcing bar 11 or a plurality of reinforcing bars 11.

The reinforcing body 10 accordingly comprises one reinforcing bar 11 or a plurality of reinforcing bars 11. Each reinforcing bar 11 has a core 17 and a rib structure 18 with at least one rib 19. The at least one rib 19 extends from a peripheral surface 20 of the core 17 inclined or orthogonal to the longitudinal center axis A outwardly. The cross-sectional form of the at least one rib 19 can have different configurations. In the embodiments shown in FIGS. 1 and 4 the at least one rib 19 has a mainly rectangular cross-section. In the embodiments shown in FIGS. 2 and 3 the at least one rib 19 has—with view from outside onto the reinforcing bar 11—a convex curved rib outer surface 21 that adjoins the peripheral surface 20.

The at least one rib 19 can extend helically around the longitudinal center axis A along the peripheral surface 20

(FIGS. 1-3). In these embodiments with a helical rib 19 one single helical rib 19 is illustrated as an example. In other embodiments a plurality of helical ribs 19 can be present that extend without crossing or with crossing along the peripheral surface 20.

In FIG. 4 an alternative embodiment with ring-shaped and for example circular ring-shaped ribs 19 is illustrated that are arranged with distance to each other in the direction parallel to the longitudinal center axis A.

Between two directly adjacent arranged ribs 19 of the rib structure 18 or between two directly adjacent arranged rib portions or rib sections of a single helical rib 19 a groove-shaped depression 22 is formed respectively. With one single helical rib 19 the groove-shaped depression 22 is helical and created due to the pitch of the helical rib 19, wherein the pitch depends on the radius or diameter of the core 17 and the slope of the helical rib 19. Preferably the pitch and/or the slope of a helical rib 19 are constant.

Figure 8:
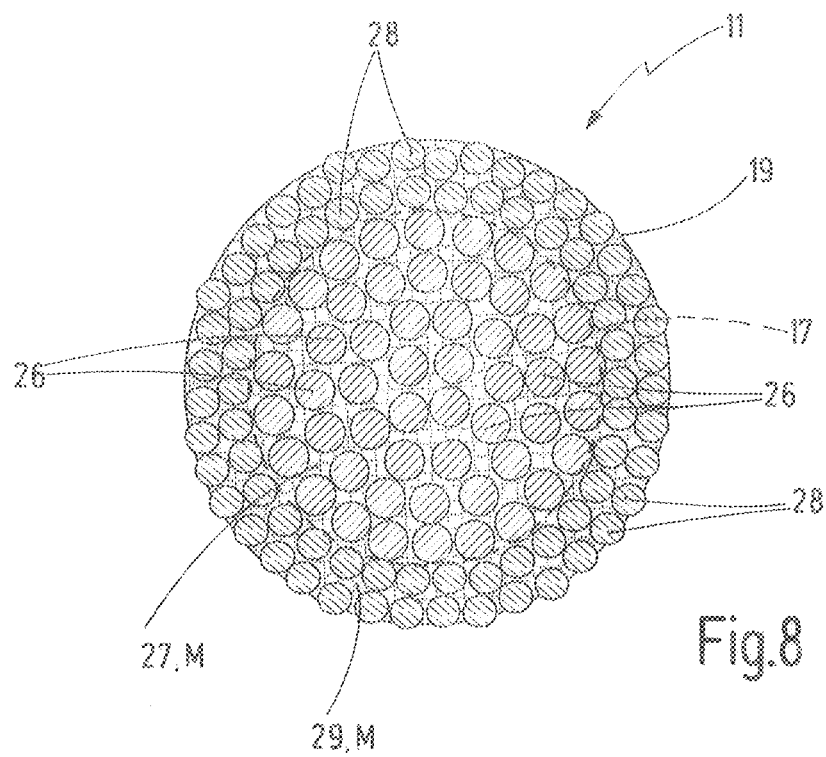
Figure 9:
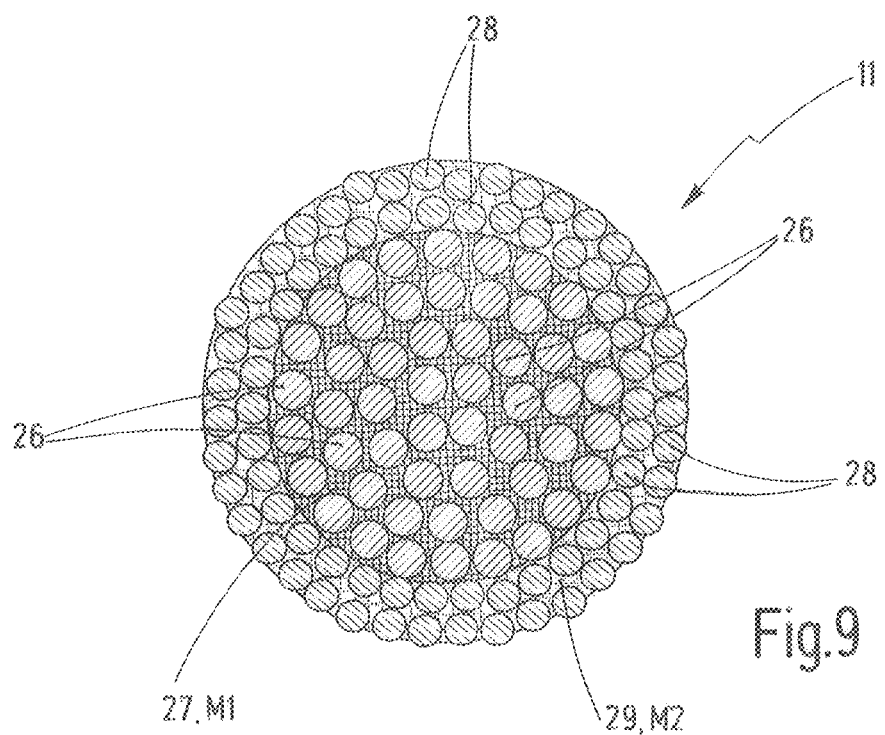

A cross-section through a reinforcing bar 11 is illustrated in FIGS. 8 and 9 respectively. The cross-section extends through the core 17 as well as through a ring-shaped rib 19 along the cutting line Q-Q in FIG. 6 according to the example. As it can be seen in FIGS. 8 and 9, the core 17 consists of at least one first fiber strand 24 with first fibers 26 that are embedded in a matrix material M of a core matrix 27. The at least one first fiber strand 24 is an endless fiber strand, e.g. a roving. The first fibers 26 consist of carbon or AR-glass according to the embodiment. Epoxy resin, vinylester, polyurethane, polyethylene, polystyrene, a polysiloxane or acrylate can be used as matrix material M for the core matrix 27.

The rib structure comprises at least one rib 19 and at least one depression 22. The at least one rib 19 consists of at least one second fiber strand 25 of second fibers 28 that was divided or separated into a plurality of fiber strand sections 25a. The second fiber strand sections 25a are embedded into a matrix material M of a rib matrix 29. The matrix material M of the rib matrix 29 is the same as the matrix material M for the core matrix 27 according to the embodiment of FIG. 8.

The fiber material of the second fibers 28 is different from the fiber material of the first fibers 26. The fiber material for the second fibers 28 can be, e.g. E-glass, ECR-glass, AR-glass, basalt or polypropylene.

In all embodiments the reinforcing bar 11 or the reinforcing body 10 made of at least one reinforcing bar 11 is free from metallic materials.

In a modified embodiment according to FIG. 9 the core matrix 27 consists of a first matrix material M1 and the rib matrix 29 consists of a second matrix material M2 that is different from the first matrix material M1.

The at least one first fiber strand 24 extends in axial direction along the longitudinal center axis A. At the locations, at which the reinforcing bar 11 comprises a bend or corner, individual first fibers 26 have different bending radii or radii of curvature. At least in the sections, in which the reinforcing bar 11 extends straight, the first fibers 26 can be mainly orientated in axial direction, wherein technically unavoidable bendings or ondulations of the first fibers 26 can be present. The better the stretching of the first fibers 26 of the at least one first fiber strand 24 is, the better the supportability of tensile forces.

The load carrying capacity of the reinforcing bar 11 is defined by the core 17. The rib structure 18 with the fiber strand sections 25a of the second fiber strand 25 embedded in the rib matrix 29 does not contribute to the increase of the tensile load carrying capacity of the reinforcing bar 11.

Rather the rib structure 18 is configured to couple the reinforcing bar 11 in the construction material matrix B of the construction material body 13. For this reason the rib structure 18 is mainly configured to support shear stress.

Because at least one groove-like depression 22 is created in the rib structure 18, the at least one rib 19 has a rib width x in direction parallel to the longitudinal center axis A, that is about orders smaller than the length of the core 17 along the longitudinal center axis A. A depression with y corresponds to the minimum distance between two directly adjacent ribs 19 or rib sections or rib portions of a helical rib 19 in axial direction.

Figure 6:
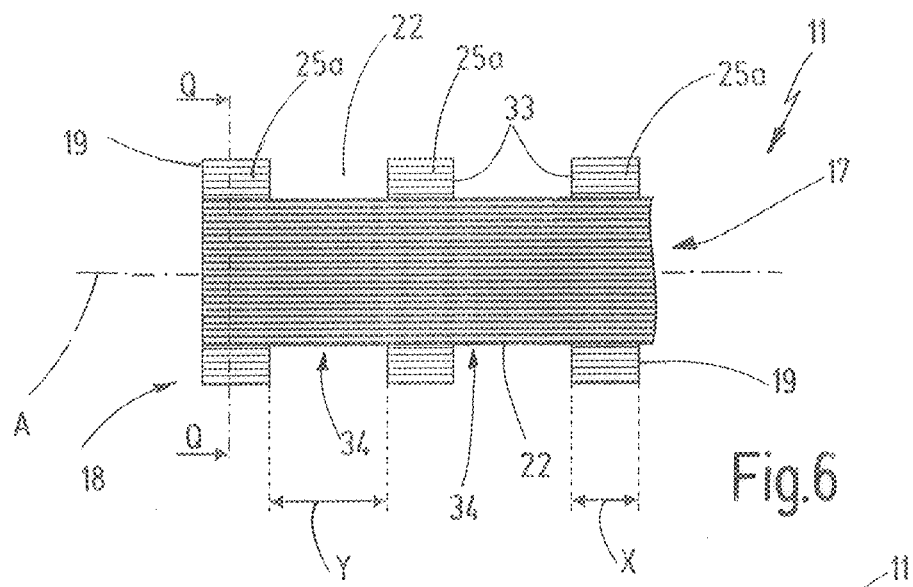
FIGS. 6 and 7 a reinforcing bar manufactured based on the reinforcing bar blank of FIG. 5 respectively, wherein at least one groove or depression was inserted into the coating layer, FIGS. 8 and 9 a cross-section view through an embodiment of a reinforcing bar respectively according to the cutting line Q-Q in FIG. 6, FIGS. 10 and 11 different conditions during the manufacturing of a reinforcing body according to an exemplary non-inventive method and FIGS. 12-15 schematic illustrations of embodiments of construction material bodies, each having a construction material matrix in which a reinforcing body is embedded respectively.

In one embodiment, particularly an embodiment in which the at least one depression 22 is created due to material removal, the rib width x can have an amount of at least 1 mm or 2 mm or 5 mm (FIG. 6). The depression width y can have an amount of, e.g. 0.5-10 mm and particularly 1-6 mm.

In one example that does not correspond to the invention and in which the at least one rib 19 is created, due to a material application onto the core 17, dimensions are typically remarkably different: The depression with y can have an amount of at least 1 mm or 2 mm or 5 mm (FIG. 6). The rib width x can have an amount of 0.5-10 mm and particularly 1-6 mm for example.

In the illustrated preferred embodiments the at least one second fiber strand 25 extends mainly parallel to the first fiber strand 24. At each location in peripheral direction around the longitudinal center axis A the directly adjacent fiber strand sections 25a separated by a depression 22 are at least mainly aligned. For the second fibers 28 of the fiber strand sections 25a it applies analog to the first fibers 26 that apart from technically necessary ondulations, they extend stretched as far as possible. At bending or corner locations of the reinforcing bar 11 the second fibers 28 can deviate from the parallelism to the longitudinal center axis A, because at such bending or corner locations of the reinforcing bar 11 different bending radii of the reinforcing bar 11 occur radial inward and radial outward.

Figure 7:
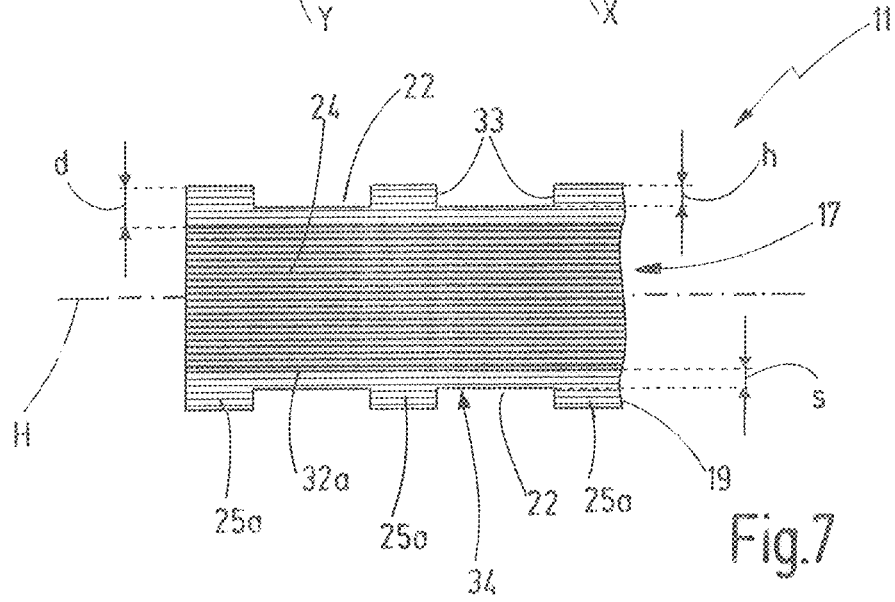

As it is illustrated in FIGS. 6 and 7, the rib width x is small compared with the length of the core 17 and/or the length of the at least one first fiber strand 24 in the core 17. In doing so, different fiber materials can be used for the first fibers 26 and the second fibers 28 that have coefficients of thermal expansion that are remarkably different. For example a combination of first fibers 26 of carbon and second fibers 28 of glass can be used. The different length variations of the second fibers 28 compared with the first fibers 26 have no or at least a non-remarkable influence on the reinforcing bar 11. Internal stress that could impact the tensile strength of the reinforcing bar 11 or the reinforcing body 10 can be at least reduced in this way.

Figure 5:
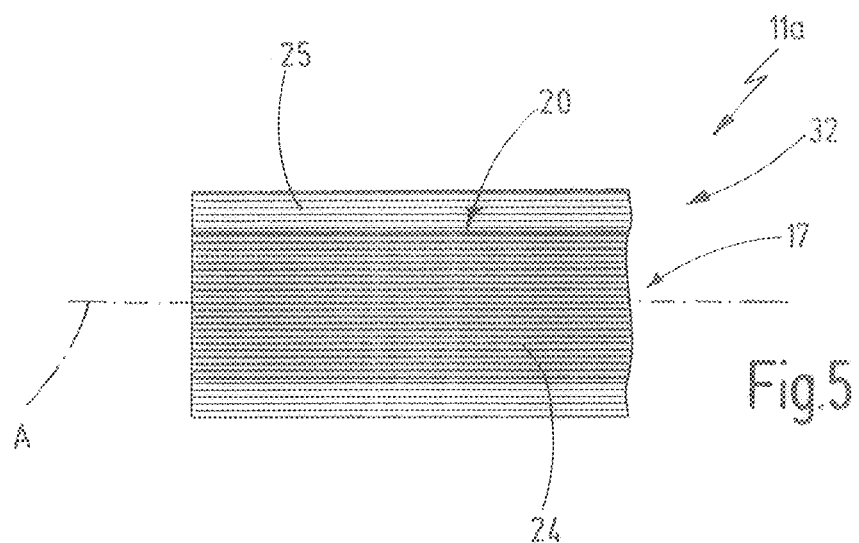

Based on the illustrations in FIGS. 5-7, a preferred method for manufacturing the reinforcing body 10 with at least one reinforcing bar 11 is illustrated. First a reinforcing bar blank 11a is manufactured that is an intermediate product during the manufacturing process so to speak. The reinforcing bar blank 11a can be manufactured, for example, by a pultrusion method and comprises a core 17 with the at least one first fiber strand 24 embedded in the core matrix 27 as well as a coating layer 32 that is directly arranged on the peripheral surface 20 of the core 17 and completely covers the peripheral surface 20 according to the example. The coating layer 32 has a hollow cylindrical configuration according to the embodiment.

The coating layer 32 is formed by a matrix material, in which the second fibers 28 are embedded. The at least one second fiber strand 25 extends in the coating layer 32 parallel to the at least one first fiber strand 24 in the core 17. The matrix material of the coating layer 32 corresponds to the matrix material of the rib matrix 29. The coating layer 32 forms the basis for manufacturing the rib structure 18. A layer thickness d of the coating layer 32 predefines the maximum height h of a rib 19 to be manufactured radial or orthogonal to the longitudinal center axis A (FIG. 5).

For creating the rib structure 28 with the at least one rib 19 at least one groove-shaped depression 22 is introduced into the coating layer 32 (FIGS. 6 and 7). The depression 22 is open to the side opposite to the core 17. In direction parallel to the longitudinal center axis A the at least one depression 22 is limited by two opposite side walls 33. The side walls 33 thus form opposite groove flanks so to speak. The two side walls 33 are connected with each other by a bottom 34 of the depression 22. The bottom 34 forms the ground of the groove. The bottom 34 can be formed by a section of the peripheral surface 20 of the core 17 (FIGS. 1-4 and 6).

Alternatively a tier 32a or a section of the coating layer 32 can remain at the peripheral surface 20, such that the bottom 34 is formed by the tier 32a (FIG. 7). The thickness s of the tier 32a has an amount of preferably at most 50% of the layer thickness d of the coating layer 32 or the height h of the at least one rib 19.

The at least one depression 22 introduced into the coating layer 32 of the reinforcing bar blank 11a is arranged completely outside of the core 17 and can extend partly (FIG. 7) or completely (FIG. 6) through the coating layer 32 according to the preferred embodiments. Depending therefrom the bottom 34 is formed by a section of the peripheral surface 20 (FIG. 6) or by not removed material of the coating layer 32 (FIG. 7). The maximum depth of the introduced at least one depression 22 is equal to the layer thickness d of the coating layer 32. In doing so, it is guaranteed that when introducing the at least one depression 22 the first fibers 26 in the core 17 remain undamaged and the maximum tensile strength provided by the reinforcing bar 11 is not negatively influenced when creating the rib structure 18.

Figure 10:
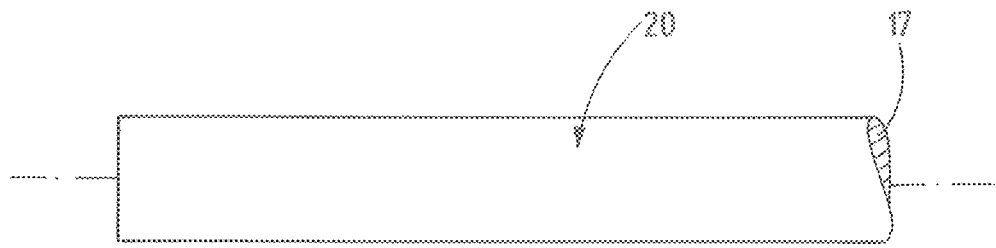
Figure 11:
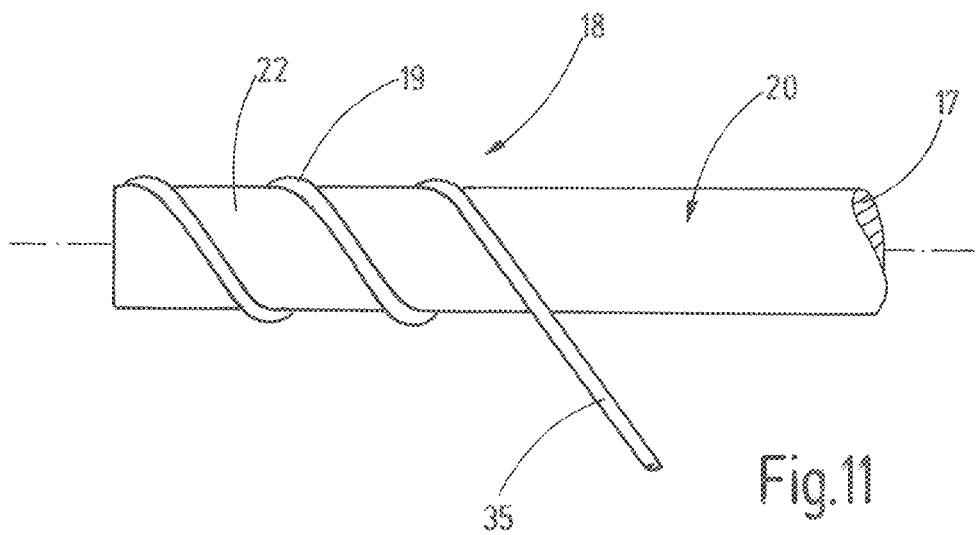
Figure 12:
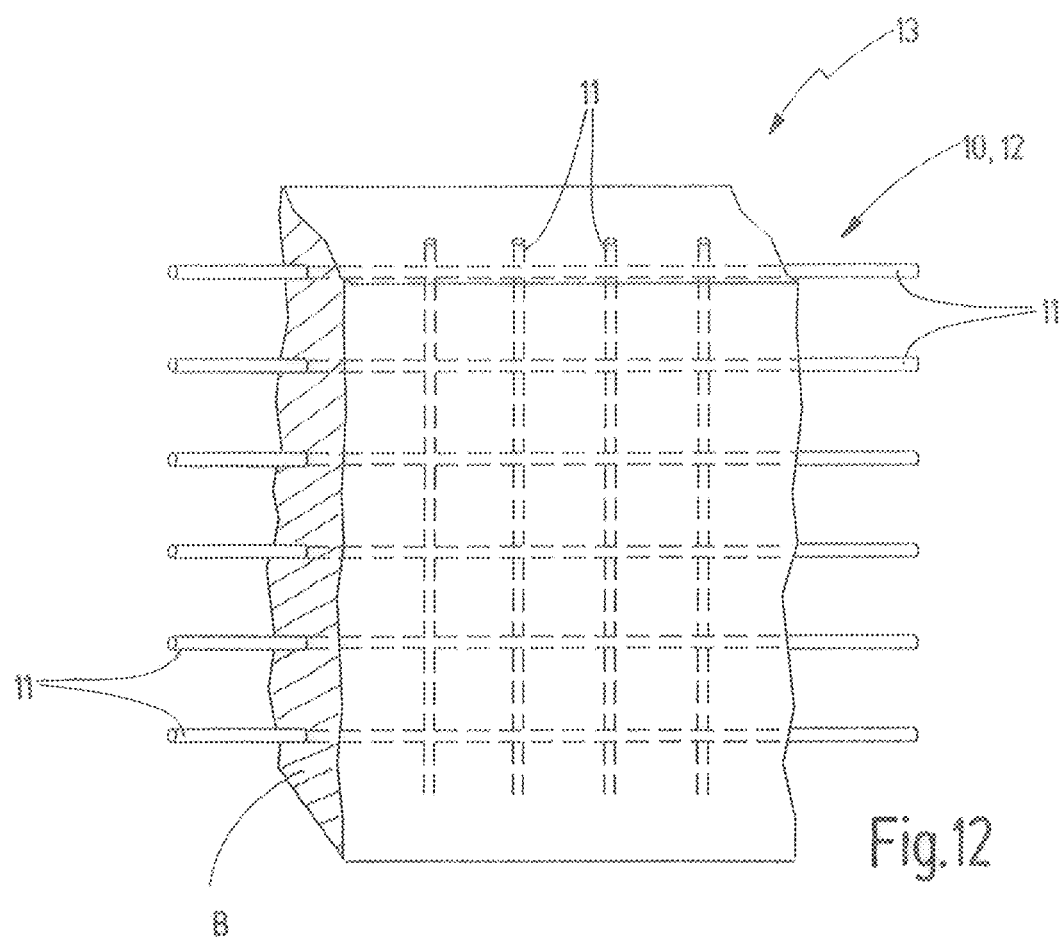

In FIGS. 10 and 11 an alternative manufacturing method for manufacturing of a reinforcing bar 11 is illustrated. In doing so, the core 17 is manufactured first, e.g. by means of a pultrusion method. Subsequently, at least one fiber strand 35 with second fibers 28 embedded in a matrix material can be applied on the peripheral surface 20 and can be attached there, particularly by means of a material bond connection, e.g. due to hardening of the matrix material of the fiber strand 35 and/or the core 17. In FIG. 11 the manufacturing of a reinforcing bar 11 with one single helical rib 19 is illustrated. In modification hereto reinforcing bars 11 with a plurality of ribs 19 can be manufactured by winding a plurality of fiber strands 35 ring-shaped and/or helically around the core 17 respectively.

The invention refers to a reinforcing body 10 and a method for its manufacturing. The reinforcing body 10 has at least one reinforcing bar 11. Each reinforcing bar 11 has a core 17 with a peripheral surface 20 at which a rib structure 18 with at least one rib 19 and at least one depression 22 is provided. The core 17 is formed by at least one first fiber strand 24 embedded in a core matrix 27. For creating the at least one rib 19 at least one second fiber strand 25 is embedded into a rib matrix 29, wherein the at least one second fiber strand 25 and the rib matrix 29 are separated by at least one depression 22 in a direction parallel to a longitudinal center axis A of the reinforcing bar 11, such that the at least one second fiber strand 25 is separated into fiber strand sections 25a. The at least one first and the at least one second fiber strand 24, 25 have fibers 26 or 28 of different materials.

LIST OF REFERENCE SIGNS 10 reinforcing body
11 reinforcing bar
11a reinforcing bar blank
12 reinforcing grid
13 construction material body
17 core
18 rib structure
19 rib
20 peripheral surface of the core
21 rib outer surface
22 depression
24 first fiber strand
25 second fiber strand
25a fiber strand section of the second fiber strand
26 first fibers
27 core matrix
28 second fibers
29 rib matrix
32 coating layer
32a tier of the coating layer
33 side wall
34 bottom
35 fiber strand
A longitudinal center axis
B construction material matrix
d layer thickness of the coating layer
h rib height
M matrix material
M1 first matrix material
M2 second matrix material
s thickness of the layer
U peripheral direction
x rib width
y depression width

The invention claimed is:

1. A reinforcing body (10), comprising:
at least one reinforcing bar (11) that extends in an axial direction along a longitudinal center axis (A) that has a core (17) and a rib structure (18) arranged at a peripheral surface (20) of the core (17) having at least one rib (19) and at least one depression (22) that each extend transversely to the axial direction, wherein the at least one rib (19) comprises one of a single helical rib having a plurality of axially spaced-apart rib portions and a plurality of separate, spaced-apart ribs,
wherein the core (17) comprises at least one first fiber strand (14) of first fibers (26) embedded in a core matrix (27), wherein the rib structure (18) comprises at least one second fiber strand (25) of second fibers (28) embedded in a rib matrix (29) divided into a plurality of separate and axially spaced-apart fiber strand sections (25a) formed by removal of at least a portion of the at least one second fiber strand (25), wherein each of the plurality of fiber strand sections extends between opposite axial ends,
wherein the fiber strand sections (25a) of the at least one second fiber strand (25) that are directly adjacent in the axial direction are separate and axially spaced from each other by the at least one transversely extending depression (22) formed by the removal of the at least a portion of the at least one second fiber strand (25) and each fiber strand section (25a) is arranged in a rib (19) or a rib portion of the at least one rib (19), wherein the fiber strand sections (25a) of the at least one second fiber strand (25) extend in the axial direction at least in straight extending sections of the reinforcing bar (11), wherein the second fibers (28) of the at least one second fiber strand (25) are made of a fiber material that is different from a fiber material of the first fibers (26) and the fiber material of the second fibers (28) is less alkali-resistant than the fiber material of the first fibers (26), and wherein the at least one rib (19) has a lateral dimension extending in a lateral direction perpendicular to the axial direction measured from the peripheral surface (20) of the core to an outer peripheral extent of the at least one rib (19), and the at least one transversely extending depression (22) has a lateral dimension extending from the peripheral surface (20) of the core (17) to an outer peripheral extent of the at least one transversely extending depression of from 0 to 50% of the lateral dimension of the at least one rib (19) such that adjacent ribs or rib portions of the at least one rib (19) are axially spaced-apart from one another by the at least one transversely extending depression.

2. The reinforcing body according to claim 1, wherein the first fibers (26) of the first fiber strand (24) are oriented mainly parallel to the longitudinal center axis (A) of the reinforcing bar (11) in straight extending sections of the reinforcing bar (11).

3. The reinforcing body according to claim 1, wherein the second fibers (28) of the fiber strand sections (25a) of the second fiber strand (25) are oriented mainly parallel to the longitudinal center axis (A) of the reinforcing bar (11) in straight extending sections of the reinforcing bar (11).

4. The reinforcing body according to claim 1, wherein the fiber material of the first fibers (26) has a higher tensile strength than the fiber material of the second fibers (28).

5. The reinforcing body according to claim 1, wherein the first fibers (26) contain carbon or AR-glass.

6. The reinforcing body according to claim 1, wherein the second fibers (28) comprise glass or polymer material or consist of glass or polymer material.

7. The reinforcing body according to claim 1, wherein at least one of the core matrix (27) of the reinforcing bar (11) and the rib matrix (29) of the at least one rib (19) includes a uniform matrix material (M, M2).

8. The reinforcing body according to claim 7, wherein the core matrix (27) of the reinforcing bar (11) and the rib matrix (29) of the at least one rib (19) include the same matrix material (M).

9. The reinforcing body according to claim 1, wherein the fiber material of the second fibers (28) has a coefficient of thermal expansion that is different from a coefficient of thermal expansion of the fiber material of the first fibers (26).

* * * * *